United States Patent
Cromer et al.

(10) Patent No.: US 7,817,370 B2
(45) Date of Patent: Oct. 19, 2010

(54) SYSTEM AND METHOD TO AVOID DISK LUBE POOLING

(75) Inventors: Daryl Carvis Cromer, Cary, NC (US); Howard Jeffrey Locker, Cary, NC (US); Jeffrey R. Hobbet, Holly Springs, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 850 days.

(21) Appl. No.: 11/692,307

(22) Filed: Mar. 28, 2007

(65) Prior Publication Data

US 2008/0239545 A1 Oct. 2, 2008

(51) Int. Cl.
*G11B 21/04* (2006.01)

(52) U.S. Cl. ............. 360/70; 360/59; 360/77.02; 360/75; 360/78.04

(58) Field of Classification Search .............. None
See application file for complete search history.

(56) References Cited

U.S. PATENT DOCUMENTS

| | | | | |
|---|---|---|---|---|
| 4,789,913 A * | 12/1988 | Gregory et al. | ........... | 360/97.03 |
| 5,650,900 A * | 7/1997 | Wei et al. | ............... | 360/135 |
| 6,356,405 B1 * | 3/2002 | Gui et al. | ............... | 360/70 |
| 6,442,705 B1 * | 8/2002 | Lamberts | ............... | 714/2 |
| 6,678,113 B2 * | 1/2004 | Feliss et al. | ............. | 360/97.02 |
| 6,760,175 B2 * | 7/2004 | Smith | ............... | 360/69 |
| 6,822,819 B1 * | 11/2004 | Gillis et al. | ............. | 360/59 |
| 6,900,957 B2 * | 5/2005 | Gillis et al. | ............. | 360/69 |
| 6,947,234 B2 * | 9/2005 | Lamberts et al. | ........ | 360/53 |
| 7,076,604 B1 * | 7/2006 | Thelin | ............... | 711/112 |
| 7,082,007 B2 * | 7/2006 | Liu et al. | ............... | 360/77.02 |
| 7,149,046 B1 * | 12/2006 | Coker et al. | ............. | 360/75 |
| 7,177,979 B2 * | 2/2007 | Kuwamura | ............. | 711/112 |
| 2002/0075585 A1 * | 6/2002 | Luong et al. | ............. | 360/31 |
| 2006/0066971 A1 * | 3/2006 | Alex et al. | ............... | 360/31 |
| 2006/0245102 A1 * | 11/2006 | Cheng | ............... | 360/53 |
| 2007/0211363 A1 * | 9/2007 | Nagashima et al. | ...... | 360/55 |

\* cited by examiner

*Primary Examiner*—Dismery E Mercedes
(74) *Attorney, Agent, or Firm*—VanLeeuwen & VanLeeuwen; Carlos Munoz-Bustamante

(57) ABSTRACT

A system and method to avoid disk lube pooling is presented. A track access monitor tracks the number of times that a program accesses a particular track located on a hard drive. When the track access monitor determines that the number of track accesses to a particular track exceed a track access threshold, the track access monitor invokes a sequence of events to scan adjacent tracks in order to uniformly redistribute lubrication over the hard drive. In one embodiment, the track access monitor incrementally performs the adjacent track scanning during hard drive idle periods, such as when the system waits for a password from a user or when the operating system conserves power and idles the hard drive due to lack of activity.

17 Claims, 6 Drawing Sheets

| Track Access Store ||| 
|---|---|---|
| Target Track | # Accesses | Adjacent Tracks |
| B | 41 | A, C |
| E | 4 | D, F |
| H | 15 | G, I |
| K | 27 | J, L |

*FIG. 5*

SYSTEM AND METHOD TO AVOID DISK LUBE POOLING

BACKGROUND OF THE INVENTION

1. Technical Field

The present invention relates to a system and method to avoid disk lube pooling. More particularly, the present invention relates to a system and method for tracking an amount of accesses to target tracks included on a hard drive and scanning their adjacent tracks after an excessive amount of accesses to the target tracks in order to uniformly redistribute the lubrication from the adjacent tracks to the target track.

2. Description of the Related Art

Specialized computers are beginning to replace traditional appliances to perform specialized tasks. For example, specialized computers commonly perform tasks that cash registers, information booths, and kiosks once performed. These specialized computers typically execute an application-specific program for repeatedly performing a few of the same type of functions. A challenge found, however, is that problems arise in particular components when the application-specific program repeatedly performs only a few tasks.

One such problem is that the application-specific programs repeatedly write to a select number of tracks on a hard drive. For example, a cash register program may repeatedly store the amount of money that should be in the cash register after each transaction in a particular track. A challenge found with excessive accesses to a particular hard drive track is that lubrication on the hard drive looses its uniform distribution on the surface of the hard drive. Over time, constant writing to a target track results in the lubrication thinning over the target track and pooling on adjacent tracks, similar to plowing snow on a road. This pooling creates problems when the head moves to different tracks because the head either hits the "bumps," or the lube collects on the head, reducing its sensitivity.

What is needed, therefore, is a system and method to uniformly redistribute the hard drive's lubrication without impacting system performance.

SUMMARY

It has been discovered that the aforementioned challenges are resolved using a system and method for tracking the amount of accesses to a target track included on a hard drive and scanning its adjacent tracks after an excessive amount of accesses to the target track in order to uniformly redistribute the lubrication from the adjacent tracks to the target track. A track access monitor tracks the number of times that a program accesses a particular track located on a hard drive. When the track access monitor determines that the number of track accesses to a particular track exceed a track access threshold, the track access monitor invokes a sequence of events to scan adjacent tracks in order to uniformly redistribute lubrication over the hard drive.

A computer system includes an application-specific program that repeatedly accesses a target track corresponding to an address on a hard drive. A track access monitor logs the number of times that the program accesses the target track and, in turn, determines whether the number of times that the program accessed the particular target track (track access count) exceeds a track access threshold. When the track access count exceeds the track access threshold, the track access monitor invokes an adjacent track scanning operation that scans adjacent tracks on the hard drive in order to redistribute the hard drive's lubrication.

In one embodiment, the track access monitor performs the adjacent track scanning during hard drive idle periods, such as when the system waits for a password from a user or when the operating system conserves power and idles the hard drive due to lack of activity. In this embodiment, the track access monitor detects the start of a hard drive idle period and begins to scan adjacent tracks. When the hard drive idle period ends and the adjacent track scanning is not complete, the track access monitor stores a "stop track location" as a "new start track location," which is the last track that was scanned prior to the end of the hard drive idle period. Continuing with this embodiment, when the track access monitor detects the next hard drive idle period, the track access monitor restarts adjacent track scanning at the new start track location. This process continues until the track access monitor completes adjacent track scanning.

In a similar embodiment, when a hard drive remains active for an extended period of time (i.e. hard drive active time limit) and does not switch into an idle state, the invention described herein forces an adjacent track scan in order to uniformly redistribute the hard drive's lubrication.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 5 is a table showing the number of times that a program accesses a particular hard drive track.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
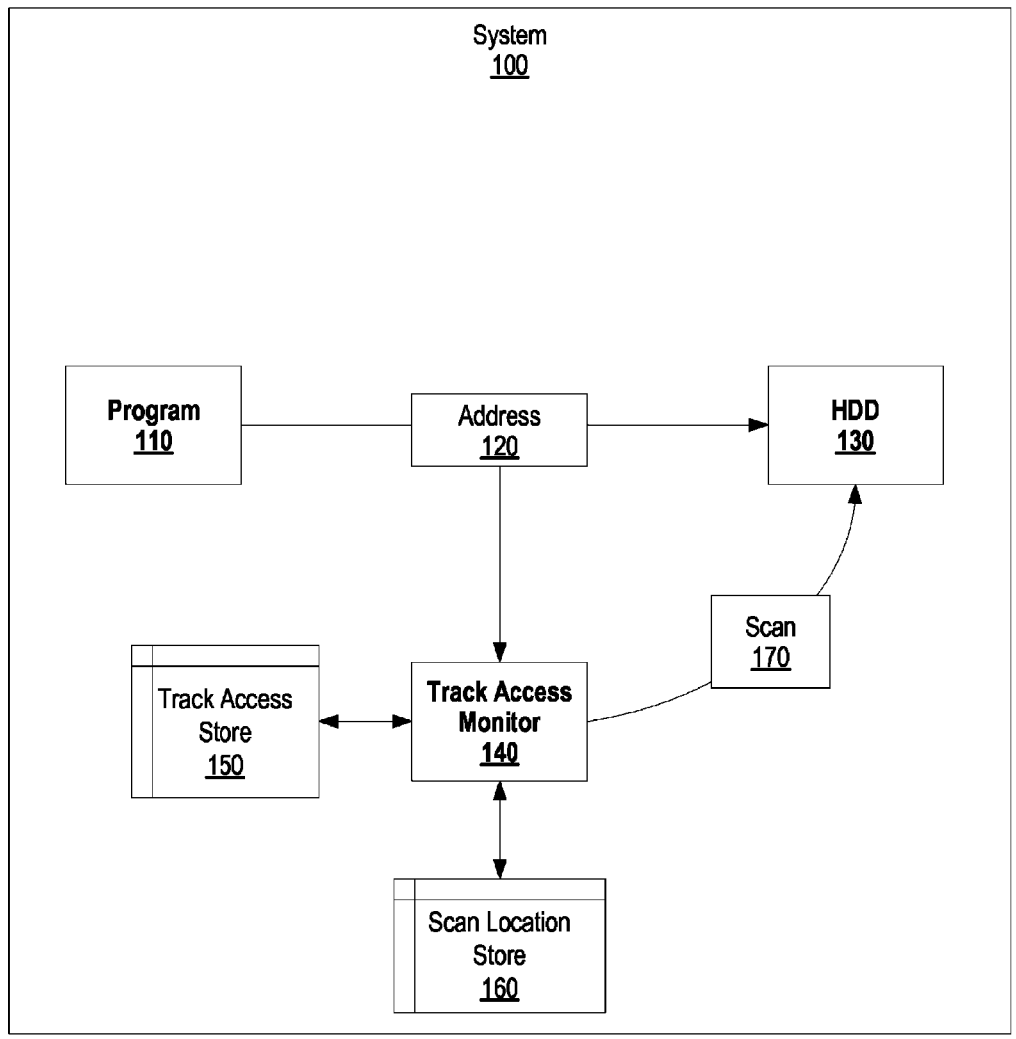
FIG. 1 is a diagram showing a track access monitor performing adjacent track scans when a program excessively accesses a particular hard drive target track.

FIG. 1 is a diagram showing a track access monitor performing adjacent track scans when a program excessively accesses a particular hard drive target track. System 100 includes track access monitor 140, which tracks the number of times that program 110 accesses a particular track located on hard drive 130. When track access monitor 140 determines that the number of track accesses to a particular track exceed a track access threshold, track access monitor 140 invokes a sequence of events to scan adjacent tracks in order to uniformly redistribute lubrication on hard drive 130.

System 100 includes program 100, which is an application-specific program that repeatedly accesses a target track corresponding to address 120 on hard drive 130. For example, program 100 may be a cash register program that repeatedly stores the amount of money that should be in the cash register after each transaction. Over time, the lubrication thins over the target track that corresponds to address 120 and pools above the target track's adjacent tracks (see FIG. 2A and corresponding text for further details).

Track access monitor 140 logs the number of times that program 110 accesses the target track that corresponds to address 120 in track access store 150. In turn, track access monitor 140 determines whether the number of times that program 110 accessed the particular target track (track access count) exceeds a track access threshold. When the track access count exceeds the track access threshold, track access monitor 140 performs scan 170, which scans adjacent tracks in hard drive 130 in order to redistribute hard drive 130's lubrication (see FIG. 2B and corresponding text for further details). Track access store 150 may be stored on a volatile storage area, such as computer memory.

In one embodiment, track access monitor 140 performs the adjacent track scanning during hard drive idle periods, such as when system 100 waits for a password from a user or when system 100's operating system conserves power and idles hard drive 130 due to lack of activity. In this embodiment, track access monitor 140 detects the start of a hard drive idle period and begins to scan adjacent tracks. When the hard drive idle period ends and the adjacent track scanning is not complete, track access monitor 140 stores a "stop track location" as a "new start track location" in scan location store 160, which is the last track that was scanned prior to the end of the hard drive idle period. Continuing with this embodiment, when track access monitor 140 detects the next hard drive idle period, track access monitor 140 restarts adjacent track scanning at the new start track location. This process continues until track access monitor 140 completes adjacent track scanning. Scan location store 160 may be stored on a volatile storage area, such as computer memory.

In a similar embodiment, when hard drive 130 remains active for an extended period of time (i.e. hard drive active time limit) and does not switch into an idle state, track access monitor 140 invokes scan 170 in order to uniformly redistribute hard drive 130's lubrication.

Figure 2A:
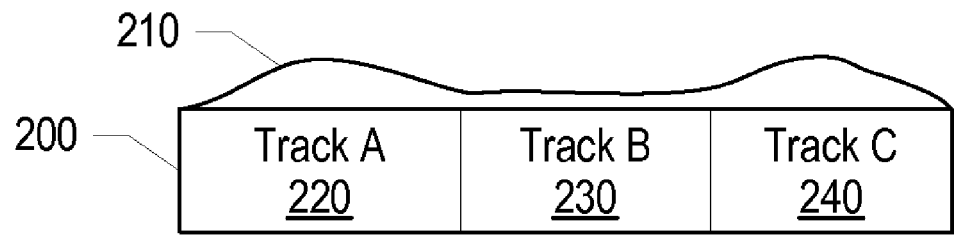
FIG. 2A is a diagram showing a hard disk's lubrication pooling due to multiple track accesses.

FIG. 2A is a diagram showing a hard disk's lubrication pooling due to multiple track accesses. When a system excessively accesses a particular hard drive track, the hard drive's lubrication (lubrication 210) starts to "pool" in adjacent tracks. As shown in FIG. 2A, when a program excessively accesses hard drive 200's track B 230, lubrication 210 pools over adjacent tracks A 220 and C 240. The invention described herein scans adjacent tracks A 220 and C 240 in order to redistribute lubrication 210 in a uniform manner (see FIG. 2B and corresponding text for further details).

Figure 2B:
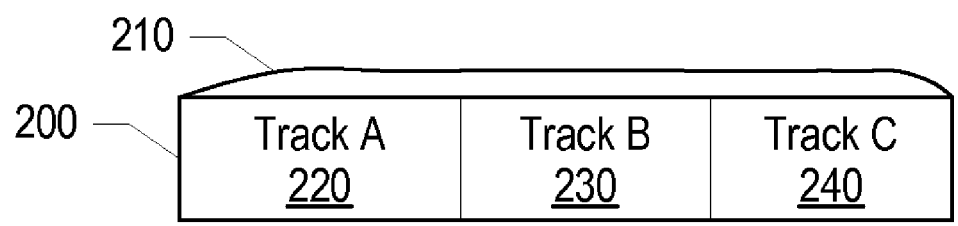
FIG. 2B is a diagram showing a hard disk's uniform lubrication after a track access monitor invokes adjacent track scanning.

FIG. 2B is a diagram showing a hard disk's uniform lubrication after a track access monitor invokes adjacent track scanning. When a track access monitor detects that a program excessively accesses hard drive 200's track B 230, the track access monitor begins a process of scanning adjacent tracks (tracks A 220 and B 240) in order to redistribute lubrication 210. As FIG. 2B shows, lubrication 210 is uniformly redistributed over tracks A 220, B 230, and C 240. Hard drive 200, lubrication 210, track A 220, track B 230, and track C 240 are the same as that shown in FIG. 2A.

Figure 3:
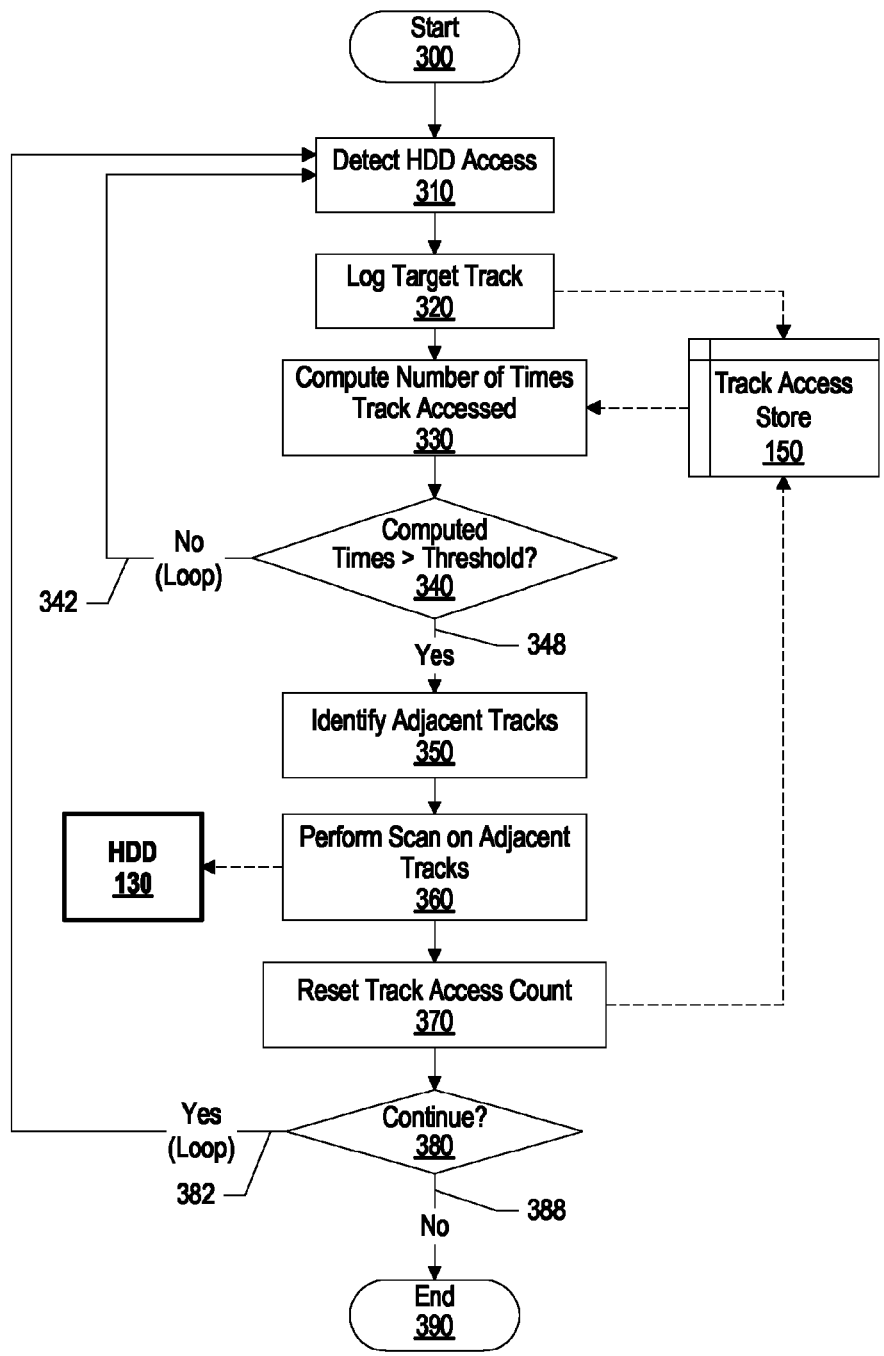
FIG. 3 is a flowchart showing steps taken in scanning adjacent tracks located on a hard drive when a track access monitor determines that a program excessively accesses a particular target track.

FIG. 3 is a flowchart showing steps taken in scanning adjacent tracks located on a hard drive when a track access monitor determines that a program excessively accesses a particular target track. Processing commences at 300, whereupon processing detects a hard drive access to a particular target track, such as writing to track B 230 as shown in FIG. 2A (step 310). At step 320, processing logs the target track in track access store 150. Track access store 150 is the same as that shown in FIG. 1.

Processing computes a "track access count" for the accessed track (e.g., track "B") in order to determine the number of times that the particular track is written (step 330). In one embodiment, the track access count for a particular track may be reset when processing detects that one of its adjacent tracks is accessed. In another embodiment, track access store 150 may include a table to monitor track access counts (see FIG. 5 and corresponding text for further details).

A determination is made as to whether the track access count is greater than a track access threshold (decision 340). For example, a hardware manufacturer may configure the track access threshold to be fifty occurrences. In this example, when a particular track is accessed more than fifty times, processing proceeds to perform a scan on adjacent tracks (discussed below).

If the track access count is not greater than the track access threshold, decision 340 branches to "No" branch 342, which loops back to process more hard drive accesses. This looping continues until the track access count exceeds the track access threshold, at which point decision 340 branches to "Yes" branch 348.

Processing, at step 350, identifies adjacent tracks included on hard drive 130 relative to the target track, such as tracks A 220 and B 240 shown in FIG. 2A. At step 360, processing scans the adjacent tracks in hard drive 130 in order to uniformly redistribute hard drive 130's lubrication, such as that shown in FIG. 2B. Hard drive 130 is the same as that shown in FIG. 1.

Once scanning completes, processing resets the track access count for the target track in track access store 150 at step 370. A determination is made as to whether to continue monitoring and processing hard drive accesses (decision 380). If processing should continue, decision 380 branches to "Yes" branch 382, which loops back to process more hard drive accesses. This looping continues until processing should terminate, at which point decision 380 branches to "No" branch 388 whereupon processing terminates at 390.

Figure 4:
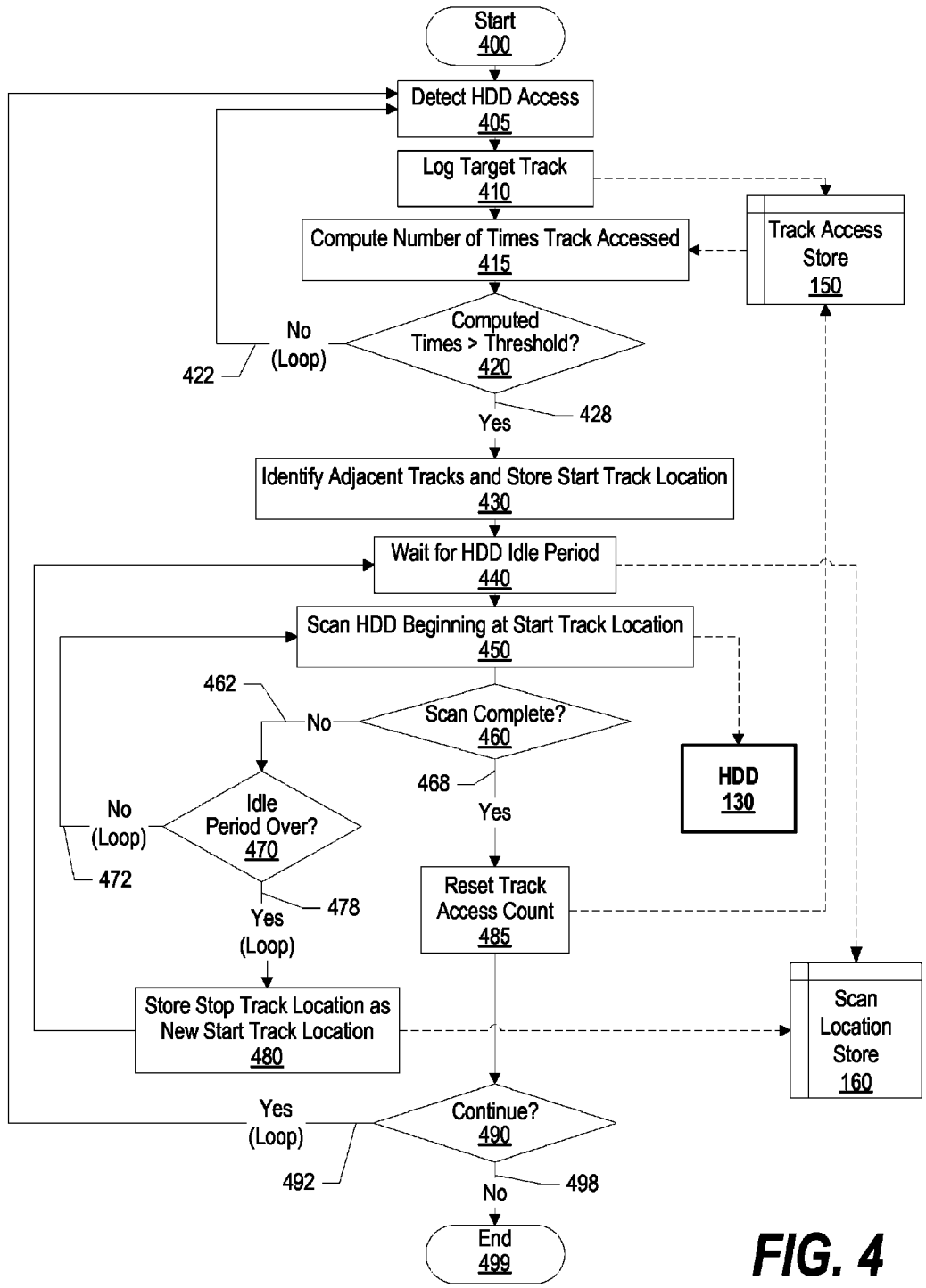
FIG. 4 is a flowchart showing steps taken in scanning adjacent tracks located on a hard drive during hard drive idle periods.

FIG. 4 is a flowchart showing steps taken in scanning adjacent tracks located on a hard drive during hard drive idle periods. The embodiment shown in FIG. 4 is similar to FIG. 3 with the exception that the embodiment shown in FIG. 4 waits for a hard drive idle period before performing adjacent track scan operations.

Processing commences at 400, whereupon processing detects a hard drive access to a particular target track at step 405. At step 410, processing logs the target track in track access store 150. Track access store 150 is the same as that shown in FIG. 1. Processing computes a track access count for the accessed track in order to determine the number of times that the particular track is written (step 415). Again, in one embodiment, the track access count for a particular track may be reset when processing detects that one of its adjacent tracks is accessed.

A determination is made as to whether the track access count is greater than a track access threshold (decision 420).

If the track access count is not greater than the track access threshold, decision 420 branches to "No" branch 422, which loops back to process more hard drive accesses. This looping continues until the track access count exceeds the track access threshold, at which point decision 420 branches to "Yes" branch 428.

At step 430, processing identifies adjacent tracks relative to the target track and stores the location as a "start track location" in scan location store 160. Processing then waits for a hard drive idle period (step 440), such as when waiting for a user to enter a password upon power on. Once processing detects a hard drive idle period, processing begins scanning hard drive 130 at step 450.

A determination is made as to whether the scan is complete (decision 460). If the scan is not complete, decision 460 branches to "No" branch 462 whereupon a determination is made as to whether the hard drive idle period is over (e.g., password entered) (decision 470). If the wait period is not over, decision 470 branches to "No" branch 472, which loops back to continue to scan hard drive 130.

On the other hand, if the wait period is over and the scan is not complete, decision 470 branches to "Yes" branch 478 whereupon processing stops scanning hard drive 130, stores a stop track location as a new start track location, and loops back to wait for another hard drive idle period. Processing uses the new start track location when re-starting the scanning process at step 450 after detecting another hard drive idle period. This looping continues until the scan is complete, at which point decision 460 branches to "Yes" branch 468 whereupon processing resets the track access count located in track access store 150 (step 485).

A determination is made as to whether to continue processing (decision 490). If processing should continue, decision 490 branches to "Yes" branch 492, which loops back to process more hard drive target track accesses. This looping continues until processing should terminate, at which point decision 490 branches to "No" branch 498 whereupon processing ends at 499.

In one embodiment, a manufacturer may configure a "hard drive active time limit" that limits the amount of time that a hard drive may continually remain active. In this embodiment, when the hard drive exceeds the hard drive active time limit, the invention described invokes an adjacent track scan in order to uniformly redistribute the hard drive's lubrication.

FIG. 5 is a table showing the number of times that a program accesses a particular hard drive track. The embodiment shown in FIG. 5 is a tabular form and, as those skilled in the art can appreciate, track access store 150 may include line entries for each time the program accesses a target track, and subsequently compute a track access count for a particular target track. Track access store 150 is the same as that shown in FIG. 1.

Track access store 150 includes columns 500 through 520. Column 500 includes particular target tracks that the program accesses, and column 510 includes a track access count for each of the target tracks. Column 520 includes adjacent tracks relative to each target track that are scanned when a corresponding target track's track access count exceeds a given track access threshold. For example, row 530 shows that target track B's track access count is 41. Assuming that the track access threshold is 40, the track access monitor scans adjacent tracks A and C to redistribute pooled lubrication on adjacent tracks A and C over to track B in order to have uniform lubrication over tracks A, B, and C.

Figure 6:
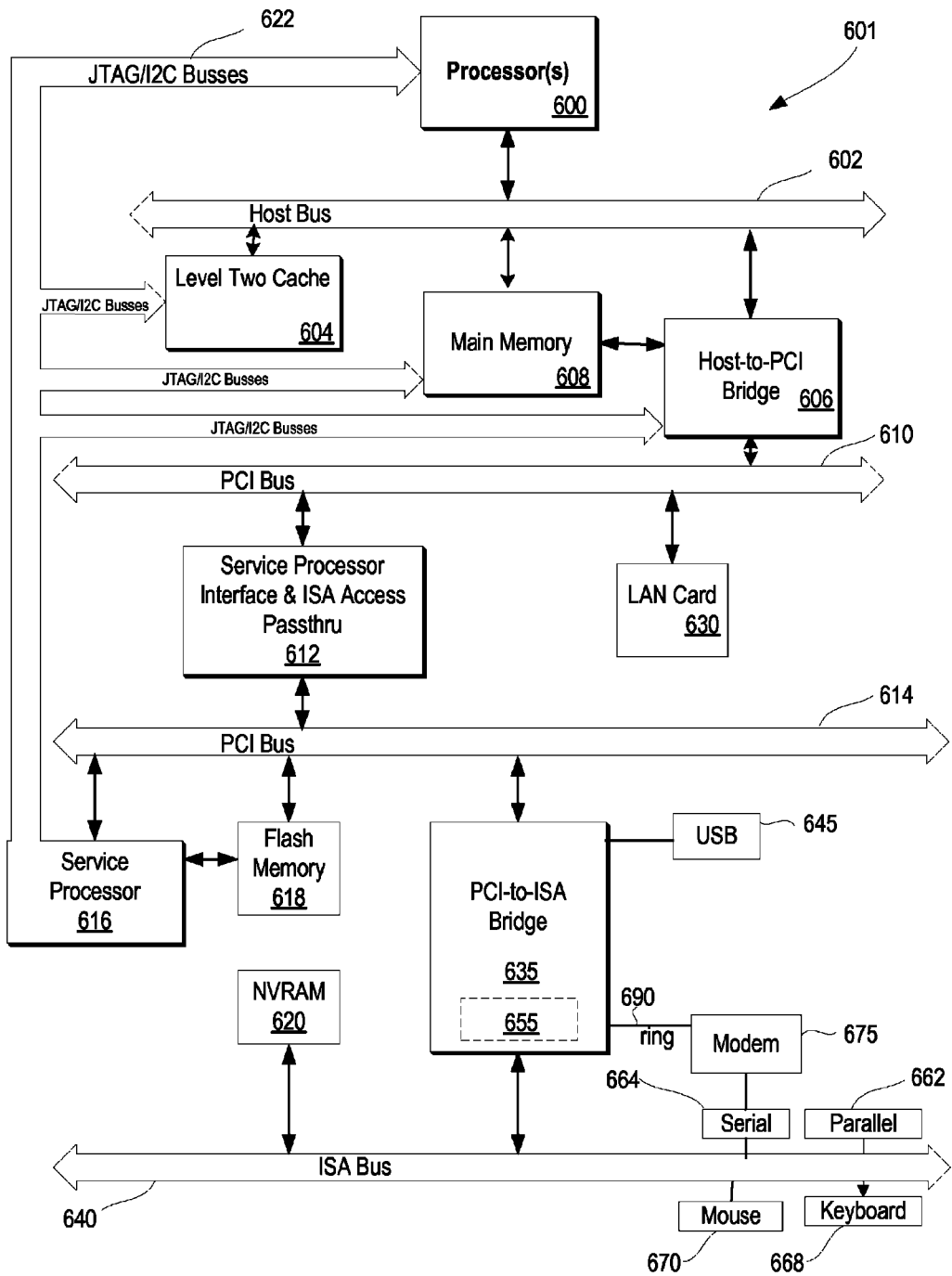
FIG. 6 is a block diagram of a computing device capable of implementing the present invention.

FIG. 6 illustrates information handling system 601 which is a simplified example of a computer system capable of performing the computing operations described herein. Computer system 601 includes processor 600 which is coupled to host bus 602. A level two (L2) cache memory 604 is also coupled to host bus 602. Host-to-PCI bridge 606 is coupled to main memory 608, includes cache memory and main memory control functions, and provides bus control to handle transfers among PCI bus 610, processor 600, L2 cache 604, main memory 608, and host bus 602. Main memory 608 is coupled to Host-to-PCI bridge 606 as well as host bus 602. Devices used solely by host processor(s) 600, such as LAN card 630, are coupled to PCI bus 610. Service Processor Interface and ISA Access Pass-through 612 provides an interface between PCI bus 610 and PCI bus 614. In this manner, PCI bus 614 is insulated from PCI bus 610. Devices, such as flash memory 618, are coupled to PCI bus 614. In one implementation, flash memory 618 includes BIOS code that incorporates the necessary processor executable code for a variety of low-level system functions and system boot functions.

PCI bus 614 provides an interface for a variety of devices that are shared by host processor(s) 600 and Service Processor 616 including, for example, flash memory 618. PCI-to-ISA bridge 635 provides bus control to handle transfers between PCI bus 614 and ISA bus 640, universal serial bus (USB) functionality 645, power management functionality 655, and can include other functional elements not shown, such as a real-time clock (RTC), DMA control, interrupt support, and system management bus support. Nonvolatile RAM 620 is attached to ISA Bus 640. Service Processor 616 includes JTAG and I2C busses 622 for communication with processor(s) 600 during initialization steps. JTAG/I2C busses 622 are also coupled to L2 cache 604, Host-to-PCI bridge 606, and main memory 608 providing a communications path between the processor, the Service Processor, the L2 cache, the Host-to-PCI bridge, and the main memory. Service Processor 616 also has access to system power resources for powering down information handling device 601.

Peripheral devices and input/output (I/O) devices can be attached to various interfaces (e.g., parallel interface 662, serial interface 664, keyboard interface 668, and mouse interface 670 coupled to ISA bus 640. Alternatively, many I/O devices can be accommodated by a super I/O controller (not shown) attached to ISA bus 640.

In order to attach computer system 601 to another computer system to copy files over a network, LAN card 630 is coupled to PCI bus 610. Similarly, to connect computer system 601 to an ISP to connect to the Internet using a telephone line connection, modem 665 is connected to serial port 664 and PCI-to-ISA Bridge 635.

While FIG. 6 shows one information handling system that employs processor(s) 600, the information handling system may take many forms. For example, information handling system 601 may take the form of a desktop, server, portable, laptop, notebook, or other form factor computer or data processing system. Information handling system 601 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   detecting an access to a target track located on a hard drive;
   in response to detecting the access to the target track, computing a track access count corresponding to the target track;
   determining that the track access count exceeds a track access threshold; and
   scanning a portion of the hard drive in response to the determining, wherein the scanning results in uniformly distributing lubrication over the target track and one or more adjacent tracks, the one or more adjacent tracks being adjacent to the target track.

2. The method of claim 1 wherein the scanned portion of the hard drive corresponds to the one or more adjacent tracks, and wherein the scanning does not result in a complete scan of the hard drive.

3. The method of claim 1 further comprising:
   detecting a hard drive idle period; and
   scanning the portion of the hard drive in response to detecting the hard drive idle period.

4. The method of claim 3 further comprising:
   identifying a start track location;
   starting the scanning of the portion of the hard drive at the start track location;
   detecting that the hard drive idle period has ended;
   in response to detecting that the hard drive idle period has ended, stopping the scanning of the portion of the hard drive; and
   in response to stopping the scanning of the portion of the hard drive, storing a stopped track location as a new start track location.

5. The method of claim 4 further comprising:
   detecting a subsequent hard drive idle period;
   retrieving the new start track location in response to detecting the subsequent hard drive idle period;
   re-starting the scanning of the portion of the hard drive at the new start track location;
   after the re-starting, determining that the scanning of the portion of the hard drive is complete; and
   in response to determining that the scanning of the portion of the hard drive is complete, resetting the track access count.

6. The method of claim 1 further comprising:
   determining that a hard drive idle period has not occurred within a hard drive active time limit; and
   performing the scanning in response to determining that the hard drive idle period has not occurred within the hard drive active time limit.

7. A computer program product stored on a non-transitory computer operable media, the computer operable media containing instructions for execution by a computer, which, when executed by the computer, cause the computer to distribute lubrication on a hard drive, the method comprising:
   detecting an access to a target track located on the hard drive;
   in response to detecting the access to the target track, computing a track access count corresponding to the target track;
   determining that the track access count exceeds a track access threshold; and
   scanning a portion of the hard drive in response to the determining, wherein the scanning results in uniformly distributing the lubrication over the target track and one or more adjacent tracks, the one or more adjacent tracks being adjacent to the target track.

8. The computer program product of claim 7 wherein the scanned portion of the hard drive corresponds to the one or more adjacent tracks, and wherein the scanning does not result in a complete scan of the hard drive.

9. The computer program product of claim 7 wherein the method further comprises:
   detecting a hard drive idle period; and
   scanning the portion of the hard drive in response to detecting the hard drive idle period.

10. The computer program product of claim 9 wherein the method further comprises:
    identifying a start track location;
    starting the scanning of the portion of the hard drive at the start track location;
    detecting that the hard drive idle period has ended;
    in response to detecting that the hard drive idle period has ended, stopping the scanning of the portion of the hard drive; and
    in response to stopping the scanning of the portion of the hard drive, storing a stopped track location as a new start track location.

11. The computer program product of claim 10 wherein the method further comprises:
    detecting a subsequent hard drive idle period;
    retrieving the new start track location in response to detecting the subsequent hard drive idle period;
    re-starting the scanning of the portion of the hard drive at the new start track location;
    after the re-starting, determining that the scanning of the portion of the hard drive is complete; and
    in response to determining that the scanning of the portion of the hard drive is complete, resetting the track access count.

12. The computer program product of claim 10 wherein the method further comprises:
 determining that a hard drive idle period has not occurred within a hard drive active time limit; and
 performing the scanning in response to determining that the hard drive idle period has not occurred within the hard drive active time limit.

13. An information handling system comprising:
 one or more processors;
 a memory accessible by the processors;
 a hard drive accessible by the processors; and
 a set of instructions stored in the memory, wherein one or more of the processors executes the set of instructions in order to perform actions of:
  detecting an access to a target track located on the hard drive;
  in response to detecting the access to the target track, computing a track access count corresponding to the target track;
  determining that the track access count exceeds a track access threshold; and
  scanning a portion of the hard drive in response to the determining, wherein the scanning results in uniformly distributing lubrication over the target track and one or more adjacent tracks, the one or more adjacent tracks being adjacent to the target track.

14. The information handling system of claim 13 wherein the scanned portion of the hard drive corresponds to the one or more adjacent tracks, and wherein the scanning does not result in a complete scan of the hard drive.

15. The information handling system of claim 13 further comprising an additional set of instructions in order to perform actions of:
 detecting a hard drive idle period; and
 scanning the portion of the hard drive in response to detecting the hard drive idle period.

16. The information handling system of claim 15 further comprising an additional set of instructions in order to perform actions of:
 identifying a start track location;
 starting the scanning of the portion of the hard drive at the start track location;
 detecting that the hard drive idle period has ended;
 in response to detecting that the hard drive idle period has ended, stopping the scanning of the portion of the hard drive; and
 in response to stopping the scanning of the portion of the hard drive, storing a stopped track location as a new start track location.

17. The information handling system of claim 16 further comprising an additional set of instructions in order to perform actions of:
 detecting a subsequent hard drive idle period;
 retrieving the new start track location in response to detecting the subsequent hard drive idle period;
 re-starting the scanning of the portion of the hard drive at the new start track location;
 after the re-starting, determining that the scanning of the portion of the hard drive is complete; and
 in response to determining that the scanning of the portion of the hard drive is complete, resetting the track access count.

* * * * *